US010292098B2

(12) United States Patent
Liu et al.

(10) Patent No.: US 10,292,098 B2
(45) Date of Patent: May 14, 2019

(54) MULTIPLE-LAYER BEACON SWEEPING METHOD, ACCESS NODE AND USER EQUIPMENT

(71) Applicant: Telefonaktiebolaget LM Ericsson (publ), Stockholm (SE)

(72) Inventors: Jinhua Liu, Beijing (CN); Gen Li, Beijing (CN); Qingyu Miao, Beijing (CN)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 159 days.

(21) Appl. No.: 15/320,042

(22) PCT Filed: Jun. 30, 2014

(86) PCT No.: PCT/CN2014/081136
§ 371 (c)(1),
(2) Date: Dec. 19, 2016

(87) PCT Pub. No.: WO2016/000121
PCT Pub. Date: Jan. 7, 2016

(65) Prior Publication Data
US 2017/0142652 A1     May 18, 2017

(51) Int. Cl.
*H04W 52/02* (2009.01)
*H04L 5/00* (2006.01)
(Continued)

(52) U.S. Cl.
CPC ....... *H04W 52/0206* (2013.01); *H04L 5/0048* (2013.01); *H04W 4/021* (2013.01);
(Continued)

(58) Field of Classification Search
CPC ....... H04W 4/00; H04W 4/021; H04W 16/28; H04W 52/02; H04W 52/0206;
(Continued)

(56) References Cited

U.S. PATENT DOCUMENTS 9,392,639 B2* 7/2016 Josiam .......... H04W 88/02
9,642,165 B2* 5/2017 Jung .............. H04B 7/0617
(Continued)

FOREIGN PATENT DOCUMENTS

WO   2014027868 A1   2/2014

OTHER PUBLICATIONS

Extended European Search Report and Search Opinion for European Patent Application No. 14896763.1, dated Jan. 17, 2018, 6 pages.
(Continued)

*Primary Examiner* — Tri H Phan
(74) *Attorney, Agent, or Firm* — Sage Patent Group

(57) ABSTRACT

A multiple-layer beacon sweeping method performed by an access node, a method performed by a user equipment, and a respective access node and user equipment are provided. The multiple-layer beacon sweeping method may comprise performing multiple beacon sweepings including at least a first beacon sweeping and a second beacon sweeping, wherein the first beacon sweeping has a first set of beams and a first coverage area and the second beacon sweeping has a second set of beams and a second coverage area, and wherein the first coverage area is larger than the second coverage area.

17 Claims, 5 Drawing Sheets

(51) Int. Cl.
*H04W 72/04* (2009.01)
*H04W 4/021* (2018.01)
*H04W 16/28* (2009.01)

(52) U.S. Cl.
CPC ......... *H04W 16/28* (2013.01); *H04W 72/046* (2013.01); *H04W 72/0446* (2013.01); *Y02D 70/1262* (2018.01)

(58) Field of Classification Search
CPC ............. H04W 72/04; H04W 72/0446; H04W 72/046; H04L 5/00; H04L 5/0048; Y02D 70/1262
See application file for complete search history.

(56) References Cited

U.S. PATENT DOCUMENTS

| | | | | |
|---|---|---|---|---|
| 9,750,027 | B2* | 8/2017 | Kim | H04W 16/28 |
| 9,882,689 | B2* | 1/2018 | Yu | H04B 7/024 |
| 9,923,283 | B2* | 3/2018 | Lee | H01Q 1/246 |
| 10,028,153 | B2* | 7/2018 | Hui | H04W 16/28 |
| 2011/0065448 | A1* | 3/2011 | Song | H04B 7/0632 455/452.2 |
| 2013/0028246 | A1 | 1/2013 | Gonikberg | |
| 2013/0143499 | A1 | 6/2013 | Ando et al. | |
| 2013/0301454 | A1* | 11/2013 | Seol | H04B 7/043 370/252 |
| 2014/0176365 | A1 | 6/2014 | Aryanfar et al. | |
| 2014/0218236 | A1* | 8/2014 | Sadeghi | H04W 16/28 342/367 |
| 2015/0236774 | A1* | 8/2015 | Son | H04B 7/0628 375/267 |
| 2015/0289147 | A1* | 10/2015 | Lou | H04B 7/0408 370/329 |
| 2015/0382334 | A1* | 12/2015 | El Ayach | H04W 16/28 370/336 |

OTHER PUBLICATIONS

International Search Report and Written Opinion for International Patent Application No. PCT/CN2014/081136, dated Apr. 3, 2015, 13 pages.

* cited by examiner

300

Performing multiple beacon sweepings (302)

Detecting a beacon signal (402)

↓

Processing a measurement related to an access node once the beacon signal is detected (404)

↓

Transmit information about the beacon signal to the access node (406)

Fig.4

MULTIPLE-LAYER BEACON SWEEPING METHOD, ACCESS NODE AND USER EQUIPMENT

This application is a 35 U.S.C. § 371 national phase filing of International Application No. PCT/CN2014/081136, filed Jun. 30, 2014, the disclosure of which is incorporated herein by reference in its entirety.

TECHNICAL FIELD

The present disclosure relates to a beacon sweeping method and in particular to a beacon sweeping method in a MMW (Millimeter Wave)-based wireless network.

BACKGROUND

A MMW-based wireless network is directed to a wireless network which uses MMW as a carrier to carry information. It mainly refers to an Ultra Dense Network, UDN which is generally regarded as the next generation communication system following the 3rd Generation Partnership Project Long Term Evolution (3GPP LTE) system. The UDN is expected to provide data rates up to 10 Gbit/s and even higher, which might meet user requirements for increasing data traffic.

Compared with technologies operating at lower frequencies, however, MMW which operates at higher frequencies may suffer more severe signal attenuation which thus results in very short transmission distances. With respect to ANs (access nodes) and/or UEs (user equipments) in the MMW-based wireless network, high gain beamforming with a large number of antenna elements is therefore mandatory which can enhance intensity of beams or increase transmission distances, thus ensuring beam coverage (or signal coverage).

Due to usage of beamforming, multiple beams in different directions that carry the same information (e.g. beacon signals, system signals, other signals which can be used for cell discovery, various measurement, information broadcast, synchronization between an AN and a UE, and so on) would be transmitted by an AN to cover a whole desired coverage area (e.g. a circular coverage area) if the AN want to broadcast system information and the like. Transmission of the multiple beams by an AN may be referred to a beacon sweeping (of course, it can be referred to a system signal sweeping, a reference signal sweeping, and so on) and can be performed periodically.

FIG. 1 illustrates an exemplary beacon sweeping performed by an AN according to the prior art. The AN has a circular coverage area and will transmit N partially overlapped beams to cover the coverage area during a period of time (e.g. during $T_a$). FIG. 2 illustrates a time diagram which shows that transmission of the N beams can be performed periodically and their period is $T_a$, for example. As can be seen from FIG. 2, within each period $T_a$, N same beams will be transmitted to cover the whole desired coverage area. The beams are nearly the same at all times. Moreover, if a large area is desired to be covered, N will be a big number. This means a large number of beams will be transmitted frequently. However, frequent transmission of the large number of beams means a large overhead (e.g. a large number of beams need to be transmitted by an AN, a lot of power will be consumed, etc), and may not be always necessary depending on various factors such as population density, coverage required actually, surroundings, and so on.

SUMMARY

One object of the present disclosure is to obviate at least some of the problems outlined above. In particular, it is an object to provide a multiple-layer beacon sweeping method performed by an access node having a plurality of antennas and a respective access node. It is further an object to provide a method performed by a user equipment in a millimeter-wave-based network and a respective user equipment. Through these methods, ANs and UEs, an overhead (e.g. transmission of beams, power) can be reduced, while an impact on a delay of AN discovery and measurement can be optimized.

According to an aspect there is provided a multiple-layer beacon sweeping method performed by an access node having a plurality of antennas in a millimeter-wave-based network. The method may comprise performing multiple beacon sweepings including at least a first beacon sweeping and a second beacon sweeping, wherein the first beacon sweeping has a first set of beams and a first coverage area and the second beacon sweeping has a second set of beams and a second coverage area, and wherein the first coverage area is larger than the second coverage area. In an embodiment, the number of beams in the first set is larger than that of beams in the second set, and a width of each beam in the first set is smaller than that of each beam in the second set.

In an embodiment, both of the first beacon sweeping and the second beacon sweeping are periodical, and the period of the first beacon sweeping is longer than that of the second beacon sweeping.

In an embodiment, if the first beacon sweeping and the second beacon sweeping overlap each other during a period of time, the second beacon sweeping is not performed during the period of time.

In an embodiment, each beam in the first set and the second set carries information indicating which beacon sweeping the beam belongs to.

In an embodiment, the multiple beacon sweepings further include a third beacon sweeping having a third set of beams and a third coverage area, and wherein the third coverage area is different from the first and the second coverage areas.

According to another aspect there is provided a method performed by a user equipment in a millimeter-wave-based network. The method may comprise detecting a beacon signal provided by any beacon sweeping that is performed by an access node having a plurality of antennas; processing a measurement related to the access node once the beacon signal is detected; and transmitting information about the beacon signal to the access node, wherein the information at least includes which beacon sweeping the beacon signal belongs to.

According to still another aspect there is provided an access node having a plurality of antennas. The access node is adapted to perform multiple beacon sweepings including at least a first beacon sweeping and a second beacon sweeping, wherein the first beacon sweeping has a first set of beams and a first coverage area and the second beacon sweeping has a second set of beams and a second coverage area, and wherein the first coverage area is larger than the second coverage area.

In an embodiment, the number of beams in the first set is larger than that of beams in the second set, and a width of each beam in the first set is smaller than that of each beam in the second set.

In an embodiment, both of the first beacon sweeping and the second beacon sweeping are periodical, and the period of the first beacon sweeping is longer than that of the second beacon sweeping.

In an embodiment, if the first beacon sweeping and the second beacon sweeping overlap each other during a period of time, the second beacon sweeping is not performed during the period of time.

In an embodiment, each beam in the first set and the second set carries information indicating which beacon sweeping the beam belongs to.

In an embodiment, the multiple beacon sweepings further include a third beacon sweeping having a third set of beams and a third coverage area, and wherein the third coverage area is different from the first and the second coverage areas.

According to yet an aspect there is provided an access node having a plurality of antennas. The access node may comprise a processor and a memory, the memory comprising instructions which when executed by the processor causes the access node to perform multiple beacon sweepings including at least a first beacon sweeping and a second beacon sweeping; wherein the first beacon sweeping has a first set of beams and a first coverage area and the second beacon sweeping has a second set of beams and a second coverage area, and wherein the first coverage area is larger than the second coverage area.

According to another aspect there is provided an access node. The access node may comprise a beacon sweeping unit for performing multiple beacon sweepings including at least a first beacon sweeping and a second beacon sweeping; wherein the first beacon sweeping has a first set of beams and a first coverage area and the second beacon sweeping has a second set of beams and a second coverage area, and wherein the first coverage area is larger than the second coverage area.

According to still an aspect there is provided a user equipment. The user equipment is adapted to detect a beacon signal provided by any beacon sweeping that is performed by an access node having a plurality of antennas; process a measurement related to the access node once the beacon signal is detected; and transmit information about the beacon signal to the access node, wherein the information at least includes which beacon sweeping the beacon signal belongs to.

According to yet an aspect there is provided a user equipment. The user equipment may comprise a processor and a memory, the memory comprising instructions which when executed by the processor causes the user equipment to: detect a beacon signal provided by any beacon sweeping that is performed by an access node having a plurality of antennas; process a measurement related to the access node once the beacon signal is detected; and transmit information about the beacon signal to the access node, wherein the information at least includes which beacon sweeping the beacon signal belongs to.

According to another an aspect there is provided a user equipment. The user equipment may comprise a detecting unit for detecting a beacon signal provided by any beacon sweeping that is performed by an access node having a plurality of antennas; a processing unit for processing a measurement related to the access node once the beacon signal is detected; and a transmitting unit for transmitting information about the beacon signal to the access node, wherein the information at least includes which beacon sweeping the beacon signal belongs to.

According to still an aspect there is provided a computer program product. The computer program product may comprise instructions which, when executed on at least one processor, cause the at least one processor to carry out the above-described methods performed by ANs.

According to yet an aspect there is provided computer program product. The computer program product may comprise instructions which, when executed on at least one processor, cause the at least one processor to carry out the above described method performed by UEs.

BRIEF DESCRIPTION OF DRAWINGS

Embodiments will now be described in more detail in relation to the accompanying drawings, in which:

FIG. 3 is a flow chart illustrating a method implemented by an AN according to an exemplary embodiment of the present invention.

FIG. 4 is a flow chart illustrating a method implemented by a UE according to an exemplary embodiment of the present invention.

DETAILED DESCRIPTION

Figure 1:
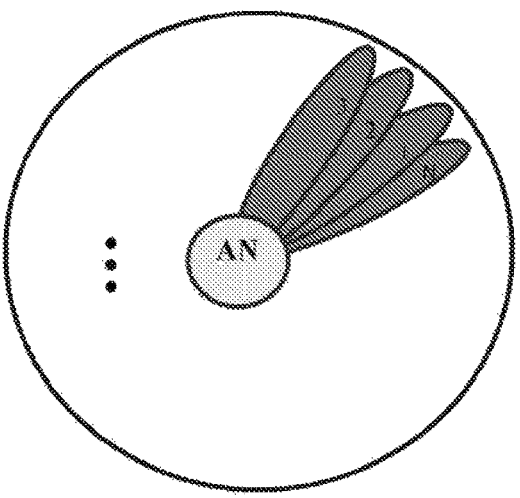
FIG. 1 illustrates an exemplary beacon sweeping performed by an AN according to the prior art.

Briefly described, a multiple-layer beacon sweeping method performed by an AN and a respective AN are provided according to the present invention. Also, a method performed by a UE and a respective UE are provided according to the present invention. In the present disclosure, unless otherwise specified, a beacon sweeping means multiple beams in multiple different directions that carry same information (e.g. beacon signals) and cover a desired coverage area will be transmitted during a period of time.

FIG. 3 is a flow chart illustrating a method 300 implemented by an AN in a MMW-based wireless network according to an exemplary embodiment of the present invention. In this embodiment, the AN has a plurality of antennas and can thus implement beamforming to transmit beams.

As shown in FIG. 3, the method 300 comprises performing multiple beacon sweepings which have different coverage areas at step 302. In each beacon sweeping, a lot of beams will be transmitted by the AN according to the invention. Each beam will carry different information, such as information indicating which beacon sweeping the beam belongs to, information indicating whether other beacon sweepings exist, and so on; and/or same information, such as system information about the AN (e.g. a beacon signal, a reference signal). Those skilled in the art may have a lot of ways to express this information, such as assigning a unique identifier to a respective beacon sweeping, and so on. These methods are well known, and thus omitted here.

According to the invention, there are a lot of ways to perform the multiple beacon sweepings by the AN. In an embodiment, the AN may first determine whether a beacon sweeping would be performed. If yes, the AN may then determine which beacon sweeping of the multiple beacon sweepings would be performed at this moment, depending on various parameters, such as a period of each beacon sweeping, a starting time at which a beacon sweeping initiates, a predefined trigger, and so on. Once the beacon sweeping is determined, the AN will determine which beam in the beacon sweeping would be transmitted. If the beam is determined, the AN will adjust its beamforming pattern according to various parameters (e.g. intensity or width of a beam) for the determined beacon sweeping, and then transmit the predefined beam which may be in a predefined direction and have a predefined intensity and/or width, for example. Next, the AN will repeat these steps to perform the multiple beacon sweepings. Since multiple different beacon sweepings, rather than only one unchanged beacon sweeping, are performed according to actual situations by the AN, an overhead (e.g. transmission of beams, power) of the AN can be reduced to some extent.

For clarity, this method will be further described in the following by way of example.

In an embodiment, the multiple beacon sweepings can comprise only two beacon sweepings, e.g. a first beacon sweeping having a first set of beams and a first coverage area and a second beacon sweeping having a second set of beams and a second coverage area, the first coverage area being different from (e.g. larger than) the second coverage area. An example about this can be clearly seen from FIG. 5.

Figure 5:
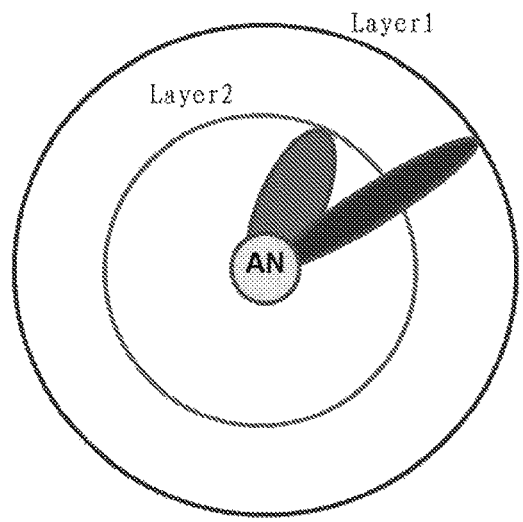
FIG. 5 illustrates dual layer beacon sweepings performed by an AN according to an exemplary embodiment of the present invention.

FIG. 5 illustrates dual layer beacon sweepings performed by an AN according to an exemplary embodiment of the present invention. In FIG. 5, a reference sign 'Layer 1' denotes a first beacon sweeping, and a reference sign 'Layer 2' denotes a second beacon sweeping. As shown in FIG. 5, the first beacon sweeping has a first circular coverage area and a first set of beams all of which can reach a boundary of the first circular coverage area from the AN (only one beam in the first set is shown in FIG. 5, and other beams in the first set are omitted for clarity). The second beacon sweeping has a second circular coverage area and a second set of beams all of which can reach a boundary of the second circular coverage area from the AN (only one beam in the second set is shown in FIG. 5, and other beams in the second set are omitted for clarity). However, it should be noted that the coverage areas are only schematic example, and not limited to be circular. Also, as shown in FIG. 5, the first coverage area is larger than the second coverage area. This means that the AN may not always use an unchanged beam with longer transmission distance and can use a beam with shorter transmission distance sometimes. Therefore, an overhead (e.g. power) of the AN can be reduced.

Figure 6:
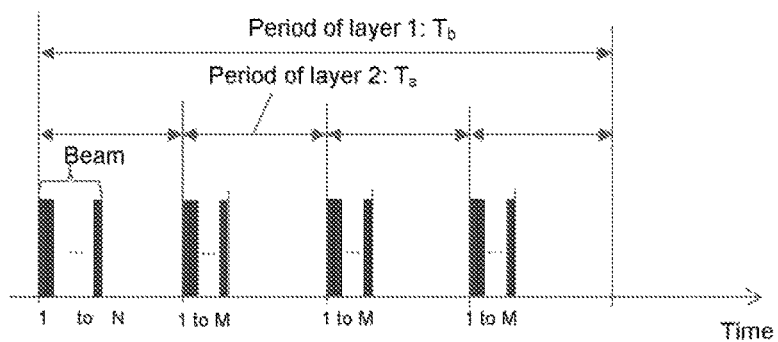
FIG. 6 illustrates a time diagram about the AN of FIG. 5 according to an exemplary embodiment of the present invention.

In an embodiment, all of the multiple beacon sweepings can be periodical and can have the same or different periods. For example, the first beacon sweeping and the second beacon sweeping in FIG. 5 can be performed periodically, and they can have the same or different periods. If they have the same period, then they may be performed at different starting times. If they have different periods, then they may be performed at the same or different times. In a preferred embodiment, a period of a beacon sweeping with larger coverage area may be longer in order to reduce an overhead (e.g. transmission of beams) of an AN (because the beacon sweeping with larger coverage area has more beams), while a period of a beacon sweeping with smaller coverage area may be shorter in order to reduce an AN discovery or measurement delay (because a UE located far away from the AN can not detect a beam provided by the beacon sweeping with smaller coverage area). For example, as shown in FIG. 6, the period of the first beacon sweeping is longer than that of the second beacon sweeping in order to reduce an overhead while reducing an AN discovery or measurement delay. Those skilled in the art can define periods of beacon sweepings according to actual requirements.

It is highly possible that different beacon sweepings overlap each other during a period of time. For example, the first beacon sweeping and the second beacon sweeping in FIG. 5 may overlap each other during a period of time. If this situation happens, the second beacon sweeping can not be performed during the period of time. In other words, if multiple beacon sweepings overlap each other partially or fully during a period of time, then only the beacon sweeping with the largest coverage area can be performed.

Such an example is shown in FIG. 6 which illustrates a time diagram about the AN of FIG. 5 according to an exemplary embodiment of the present invention. As shown in FIG. 6, a period (i.e. $T_b$) of the first beacon sweeping is four times as long as that (i.e. $T_a$) of the second beacon sweeping and starting time of the first beacon sweeping is the same as that of the second beacon sweeping. In such a case, since the first beacon sweeping and the second beacon sweeping will overlap each other within the leftmost period of the second beacon sweeping for example, only the first beacon sweeping is performed, i.e. N beams in the first beacon sweeping are transmitted and M beams in the second beacon sweeping are not transmitted.

In an embodiment, widths of beams in different beacon sweepings can be different also. For example, as shown in FIG. 5, a width of each beam in the first set (i.e. in the first beacon sweeping) is smaller than that of each beam in the second set (i.e. in the second beacon sweeping), and the number of beams in the first set is larger than that of beams in the second set.

Figure 2:
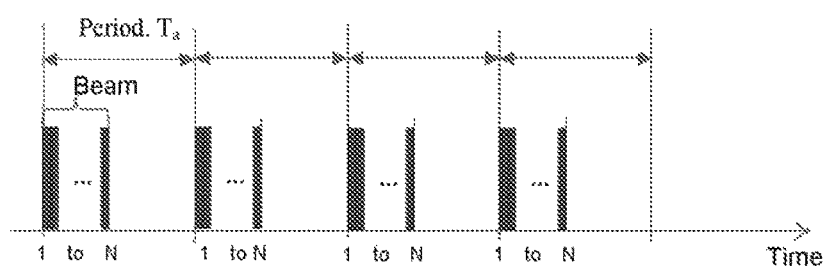
FIG. 2 illustrates a time diagram about the AN of FIG. 1 which shows that transmission of N same beams is performed periodically by the AN.

Reference is made to the example in FIGS. 5 and 6 again, and it is assumed that the number of beams in the first beacon sweeping is four times as large as that of beams in the second beacon sweeping. In this case, as shown in FIG. 6, within a period of the first beacon sweeping, i.e. $T_b$, only 7*M (i.e. N+M+M+M=N+3*M=4*M+3*M=7*M) beams are transmitted by the AN. Compared with FIGS. 1 and 2 in which 4*N=16*M beams are transmitted during a period of $T_b$, the number of the transmitted beams reduces from 16*M to 7*M. Therefore, the overhead of the AN can be reduced.

Although the above only gives examples in which the multiple beacon sweepings comprise only two beacon sweepings, the multiple beacon sweepings can comprise three or more beacon sweepings having different coverage areas. For example, the multiple beacon sweepings can further include a third beacon sweeping having a third set of beams and a third coverage area, and wherein the third coverage area is different from the first and the second coverage areas. Those skilled in the art should realize that principles applied to two beacon sweepings can also be equally applied to three or more beacon sweepings.

Embodiments herein also relate to a method implemented by a UE according to an exemplary embodiment of the present invention. Next, such an example will be described with reference to FIG. 4.

FIG. 4 is a flow chart illustrating a method 400 implemented by an UE according to an exemplary embodiment of the present invention. The method 400 comprises detecting a beacon signal (i.e. a beam carrying information) provided by any beacon sweeping that is performed by an access node having a plurality of antennas at step 402; processing a measurement (or discovery) related to the access node once the beacon signal is detected at step 404; and transmitting information about the beacon signal to the access node at step 406, wherein the information at least includes which beacon sweeping the beacon signal belongs to.

In an embodiment, if multiple beacon sweepings can be detected by the UE, then any one of the multiple beacon sweepings can be defined to use for AN discovery and measurement. In a preferred embodiment, a beacon sweeping with the largest coverage area can be used by the UE to process AN discovery and measurement.

Embodiments herein also relate to an AN according to an exemplary embodiment of the present invention. The AN has the same objects, technical features as the method performed by the AN. The AN will hence only be described in brief in order to avoid unnecessary repetition.

Figure 7:
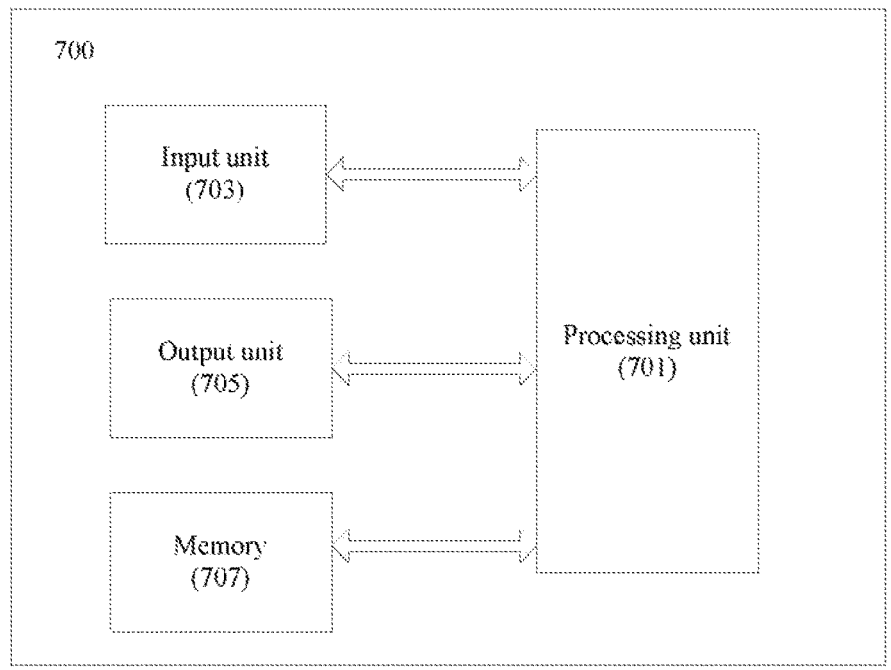
FIG. 7 is a block diagram illustrating an AN according to an exemplary embodiment of the present invention.

FIG. 7 is a block diagram illustrating an AN 700 according to an exemplary embodiment of the present invention.

The AN 700 has a plurality of antennas to implement beamforming. The AN 700 comprises a processing unit 701. The processing unit 701 is adapted to perform multiple beacon sweepings including at least a first beacon sweeping and a second beacon sweeping, wherein the first beacon sweeping has a first set of beams and a first coverage area and the second beacon sweeping has a second set of beams and a second coverage area, and wherein the first coverage area is larger than the second coverage area.

In an embodiment, the number of beams in the first set is larger than that of beams in the second set, and a width of each beam in the first set is smaller than that of each beam in the second set.

In an embodiment, both of the first beacon sweeping and the second beacon sweeping are periodical, and the period of the first beacon sweeping is longer than that of the second beacon sweeping.

In an embodiment, if the first beacon sweeping and the second beacon sweeping overlap each other during a period of time, the second beacon sweeping is not performed during the period of time.

In an embodiment, each beam in the first set and the second set carries information indicating which beacon sweeping the beam belongs to.

In an embodiment, the multiple beacon sweepings further include a third beacon sweeping having a third set of beams and a third coverage area, and wherein the third coverage area is different from the first and the second coverage areas.

The processing unit 701 may be for example a single processor or multiple processors. The processing unit 701 may be a single unit or a plurality of units to perform different actions of procedures described herein.

The AN 700 may also comprise an input unit 703. The input unit 703 is adapted to receive various information from a UE, another AN, an external device, and so on. The input unit 703 may be a receiver for example. The AN 700 may further comprise an output unit 705 adapted to transmit various information to a UE, another AN, an external device, and so on. The output unit 705 can be a transmitter for example. In an embodiment, the input unit 703 and the output unit 705 can be integrated as one unit, such as a transceiver or an antenna.

Furthermore, the AN 700 may comprise a memory 707 for storing information. The memory 707 may be a volatile or non-volatile memory, e.g. an EEPROM (Electrically Erasable Programmable Read-Only Memory), a flash memory and/or a hard drive, and so on.

The AN 700 may have the same advantages as the method performed by the AN 700.

Embodiments herein also relate to a UE according to an exemplary embodiment of the present invention. The UE has the same objects, technical features as the method performed by the UE. The UE will hence only be described in brief in order to avoid unnecessary repetition.

Figure 8:
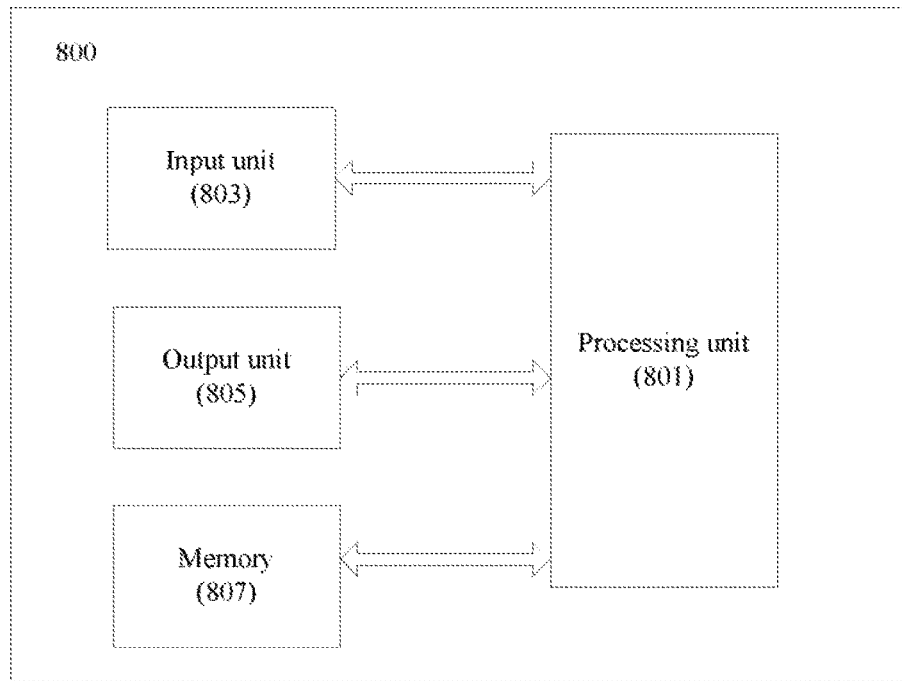
FIG. 8 is a block diagram illustrating a UE according to an exemplary embodiment of the present invention.

FIG. 8 is a block diagram illustrating a UE 800 according to an exemplary embodiment of the present invention.

The UE 800 comprises a processing unit 801. The processing unit 801 is adapted to detect a beacon signal provided by any beacon sweeping that is performed by an access node having a plurality of antennas; process a measurement related to the access node once the beacon signal is detected; and transmit information about the beacon signal to the access node, wherein the information at least includes which beacon sweeping the beacon signal belongs to.

The processing unit 801 may be for example a single processor or multiple processors. The processing unit 801 may be a single unit or a plurality of units to perform different actions of procedures described herein.

The UE 800 may also comprise an input unit 803. The input unit 803 is adapted to receive various information from another UE, an AN, an external device, and so on. The input unit 803 may be a receiver for example. The UE 800 may further comprise an output unit 805 adapted to transmit various information to another UE, an AN, an external device, and so on. The output unit 805 can be a transmitter, for example. In an embodiment, the input unit 803 and the output unit 805 can be integrated as one unit, such as a transceiver or an antenna.

Furthermore, the UE 800 may comprise a memory 807 for storing information. The memory 807 may be a volatile or non-volatile memory, e.g. an EEPROM (Electrically Erasable Programmable Read-Only Memory), a flash memory and/or a hard drive, and so on.

The UE 800 may have the same advantages as the method performed by the UE 800.

Embodiments herein also relate to an AN according to an exemplary embodiment of the present invention. The AN has the same objects, technical features as the method performed by the AN. The AN will hence only be described in brief in order to avoid unnecessary repetition.

Figure 9:
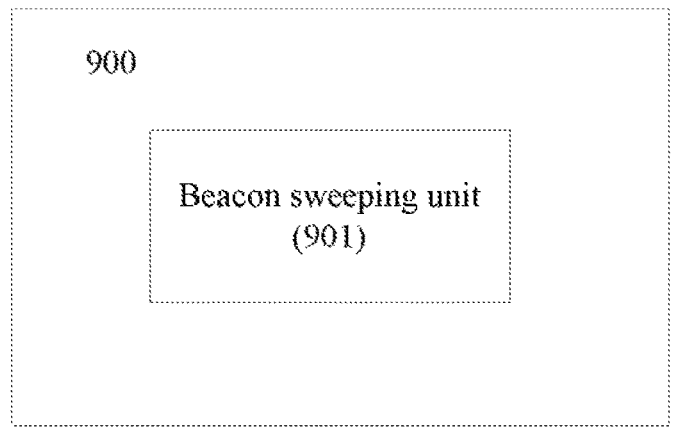
FIG. 9 is a block diagram illustrating an AN according to an exemplary embodiment of the present invention.

FIG. 9 is a block diagram illustrating an AN 900 according to an exemplary embodiment of the present invention.

The AN 900 may comprise a beacon sweeping unit for performing multiple beacon sweepings including at least a first beacon sweeping and a second beacon sweeping; wherein the first beacon sweeping has a first set of beams and a first coverage area and the second beacon sweeping has a second set of beams and a second coverage area, and wherein the first coverage area is larger than the second coverage area.

In an embodiment, the number of beams in the first set is larger than that of beams in the second set, and a width of each beam in the first set is smaller than that of each beam in the second set.

In an embodiment, both of the first beacon sweeping and the second beacon sweeping are periodical, and the period of the first beacon sweeping is longer than that of the second beacon sweeping.

In an embodiment, if the first beacon sweeping and the second beacon sweeping overlap each other during a period of time, the second beacon sweeping is not performed during the period of time.

In an embodiment, each beam in the first set and the second set carries information indicating which beacon sweeping the beam belongs to.

In an embodiment, the multiple beacon sweepings further include a third beacon sweeping having a third set of beams and a third coverage area, and wherein the third coverage area is different from the first and the second coverage areas.

The AN 900 may have the same advantages as the method performed by the AN 900.

It should be noted that FIG. 9 merely illustrates various functional units in the AN 900 in a logical sense. The functions in practice may be implemented using any suitable software and hardware means/circuits etc. Thus, the embodiments are generally not limited to the shown structures of the AN 900 and the functional units.

Embodiments herein also relate to a UE according to an exemplary embodiment of the present invention. The UE has the same objects, technical features as the method performed by the UE. The UE will hence only be described in brief in order to avoid unnecessary repetition.

Figure 10:
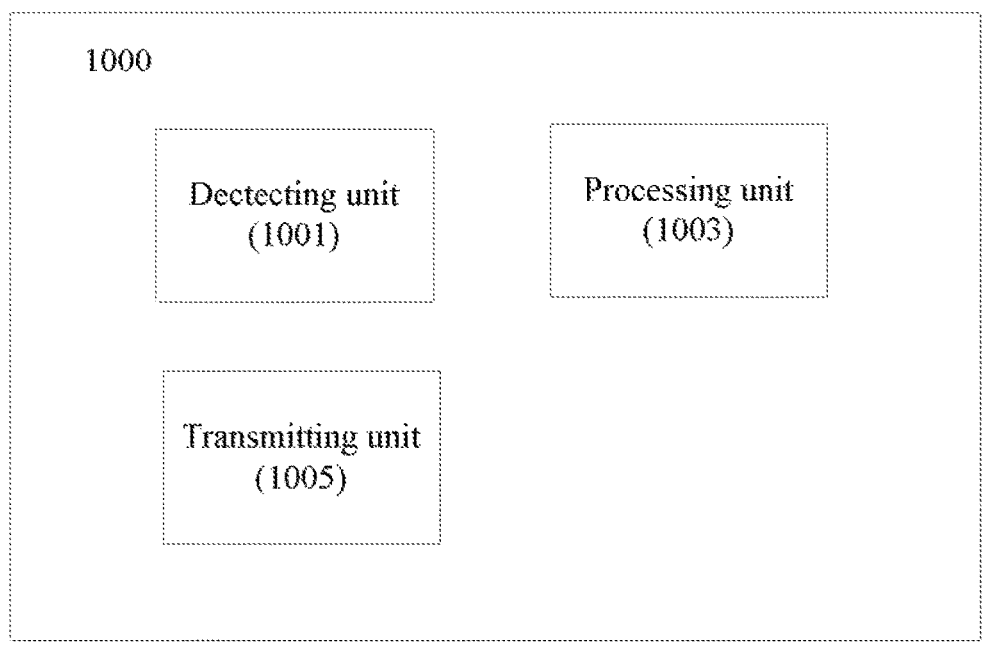
FIG. 10 is a block diagram illustrating a UE according to an exemplary embodiment of the present invention.

FIG. 10 is a block diagram illustrating a UE 1000 according to an exemplary embodiment of the present invention.

The user equipment 1000 may comprise a detecting unit for detecting a beacon signal provided by any beacon sweeping that is performed by an access node having a plurality of antennas; a processing unit for processing a measurement related to the access node once the beacon signal is detected; and a transmitting unit for transmitting information about the beacon signal to the access node, wherein the information at least includes which beacon sweeping the beacon signal belongs to.

The UE 1000 may have the same advantages as the method performed by the UE 1000.

It should be noted that FIG. 10 merely illustrates various functional units in the UE 1000 in a logical sense. The functions in practice may be implemented using any suitable software and hardware means/circuits etc. Thus, the embodiments are generally not limited to the shown structures of the UE 1000 and the functional units.

Those skilled in the art should realize that the above-described ANs and UEs are only schematic, and can be in any other forms.

In an embodiment, an AN according to an exemplary embodiment of the present invention may comprise a processor and a memory. The memory may comprise instructions which when executed by the processor causes the AN to perform multiple beacon sweepings including at least a first beacon sweeping and a second beacon sweeping; wherein the first beacon sweeping has a first set of beams and a first coverage area and the second beacon sweeping has a second set of beams and a second coverage area, and wherein the first coverage area is larger than the second coverage area.

Further, in an embodiment, a UE according to an exemplary embodiment of the present invention can comprise a processor and a memory. The memory may comprises instructions which when executed by the processor causes the UE to detect a beacon signal provided by any beacon sweeping that is performed by an access node having a plurality of antennas; process a measurement related to the access node once the beacon signal is detected; and transmit information about the beacon signal to the access node, wherein the information at least includes which beacon sweeping the beacon signal belongs to.

In an embodiment, an AN according to an exemplary embodiment of the present invention may comprise a computer program product comprising instructions which, when executed on at least one processor, cause the at least one processor to carry out the above method performed by the AN.

In an embodiment, a UE according to an exemplary embodiment of the present invention may comprise a computer program product comprising instructions which, when executed on at least one processor, cause the at least one processor to carry out the above method performed by the UE.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure can be regarded as logical entities and not with necessity as separate physical entities.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A multiple-layer beacon sweeping method performed by an access node having a plurality of antennas in a millimeter-wave-based network, the method comprising:
    performing multiple beacon sweepings including at least a first beacon sweeping and a second beacon sweeping, wherein the first beacon sweeping has a first set of beams and a first coverage area and the second beacon sweeping has a second set of beams and a second coverage area, and wherein the first coverage area is larger than the second coverage area.

2. The method of claim 1, wherein the number of beams in the first set is larger than that of beams in the second set, and a width of each beam in the first set is smaller than that of each beam in the second set.

3. The method of claim 2, wherein both of the first beacon sweeping and the second beacon sweeping are periodical, and the period of the first beacon sweeping is longer than that of the second beacon sweeping.

4. The method of claim 3, wherein if the first beacon sweeping and the second beacon sweeping overlap each other during a period of time, the second beacon sweeping is not performed during the period of time.

5. The method of claim 4, wherein each beam in the first set and the second set carries information indicating which beacon sweeping the beam belongs to.

6. The method of claim 1, wherein both of the first beacon sweeping and the second beacon sweeping are periodical, and the period of the first beacon sweeping is longer than that of the second beacon sweeping.

7. The method of claim 1, wherein if the first beacon sweeping and the second beacon sweeping overlap each other during a period of time, the second beacon sweeping is not performed during the period of time.

8. The method of claim 1, wherein each beam in the first set and the second set carries information indicating which beacon sweeping the beam belongs to.

9. An access node having a plurality of antennas configured to:

perform multiple beacon sweepings including at least a first beacon sweeping and a second beacon sweeping, wherein the first beacon sweeping has a first set of beams and a first coverage area and the second beacon sweeping has a second set of beams and a second coverage area, and wherein the first coverage area is larger than the second coverage area.

10. The access node of claim 9, wherein the number of beams in the first set is larger than that of beams in the second set, and a width of each beam in the first set is smaller than that of each beam in the second set.

11. The access node of claim 10, wherein both of the first beacon sweeping and the second beacon sweeping are periodical, and the period of the first beacon sweeping is longer than that of the second beacon sweeping.

12. The access node of claim 11, wherein if the first beacon sweeping and the second beacon sweeping overlap each other during a period of time, the second beacon sweeping is not performed during the period of time.

13. The access node of claim 12, wherein each beam in the first set and the second set carries information indicating which beacon sweeping the beam belongs to.

14. The access node of claim 9, wherein both of the first beacon sweeping and the second beacon sweeping are periodical, and the period of the first beacon sweeping is longer than that of the second beacon sweeping.

15. The access node of claim 9, wherein if the first beacon sweeping and the second beacon sweeping overlap each other during a period of time, the second beacon sweeping is not performed during the period of time.

16. The access node of claim 9, wherein each beam in the first set and the second set carries information indicating which beacon sweeping the beam belongs to.

17. A user equipment comprising a processor and a memory, the memory comprising instructions which when executed by the processor causes the user equipment to:
   detect a beacon signal provided by any beacon sweeping that is performed by an access node having a plurality of antennas;
   process a measurement related to the access node once the beacon signal is detected; and
   transmit information about the beacon signal to the access node, wherein the information at least includes which beacon sweeping the beacon signal belongs to.

* * * * *